United States Patent [19]

Durrani et al.

[11] Patent Number: 5,704,633
[45] Date of Patent: Jan. 6, 1998

[54] MODULAR CLOCK SPRING ARRANGEMENT

[75] Inventors: Sheryar Durrani, Canton; William K. Schneider, Marysville, both of Mich.

[73] Assignee: United Technologies Automotive Systems, Inc., Detroit, Mich.

[21] Appl. No.: 574,997

[22] Filed: Dec. 19, 1995

[51] Int. Cl.⁶ ............................................. B60R 21/16
[52] U.S. Cl. .................... 280/728.2; 280/731; 439/15
[58] Field of Search ........................... 280/731, 728.2, 280/728.3, 735; 439/15, 164

[56] References Cited

U.S. PATENT DOCUMENTS

| | | | |
|---|---|---|---|
| 3,525,536 | 8/1970 | Pruneski | 280/731 |
| 4,674,352 | 6/1987 | Mizuno et al. | 439/15 |
| 4,836,795 | 6/1989 | Schauer | 280/731 |
| 4,844,359 | 7/1989 | Kato | 439/15 |
| 4,975,064 | 12/1990 | Takahashi et al. | 439/15 |
| 5,046,951 | 9/1991 | Suzuki | 439/15 |
| 5,226,831 | 7/1993 | Horiuchi | 439/164 |
| 5,242,309 | 9/1993 | Hasegawa | 439/15 |
| 5,584,501 | 12/1996 | Walters | 280/731 |
| 5,584,503 | 12/1996 | Lutz | 280/731 |
| 5,624,130 | 4/1997 | Ricks | 280/728.2 |

FOREIGN PATENT DOCUMENTS

| | | |
|---|---|---|
| 3527581 | 12/1987 | Germany . |
| 4446901 | 6/1995 | Germany . |
| 4322443 | 12/1995 | Germany . |
| 2282574 | 12/1995 | United Kingdom . |

*Primary Examiner*—Paul N. Dickson
*Attorney, Agent, or Firm*—Howard & Howard

[57] ABSTRACT

A clock spring and steering wheel rear cover arrangement are particularly well-suited for a modular steering wheel and air bag sub-assembly. The clock spring is attached to the rear of a hub in the steering wheel assembly, and the rear cover snaps behind the clock spring. The clock spring and rear cover may be pre-assembled with the modular steering wheel and air bag such that the entire assembly is attached as a unit to a steering column. A tab from the rear cover may snap into an opening on the rear of the hub. The clock spring may include a hard connection into an air bag igniter, or may utilize a wire harness connection. A single opening in the rear of the hub for the steering column may receive an electrical connection for accessories on the steering wheel along with providing a connection to the air bag igniter. Also, the clock spring housing includes structure to be aligned on the steering column.

21 Claims, 4 Drawing Sheets

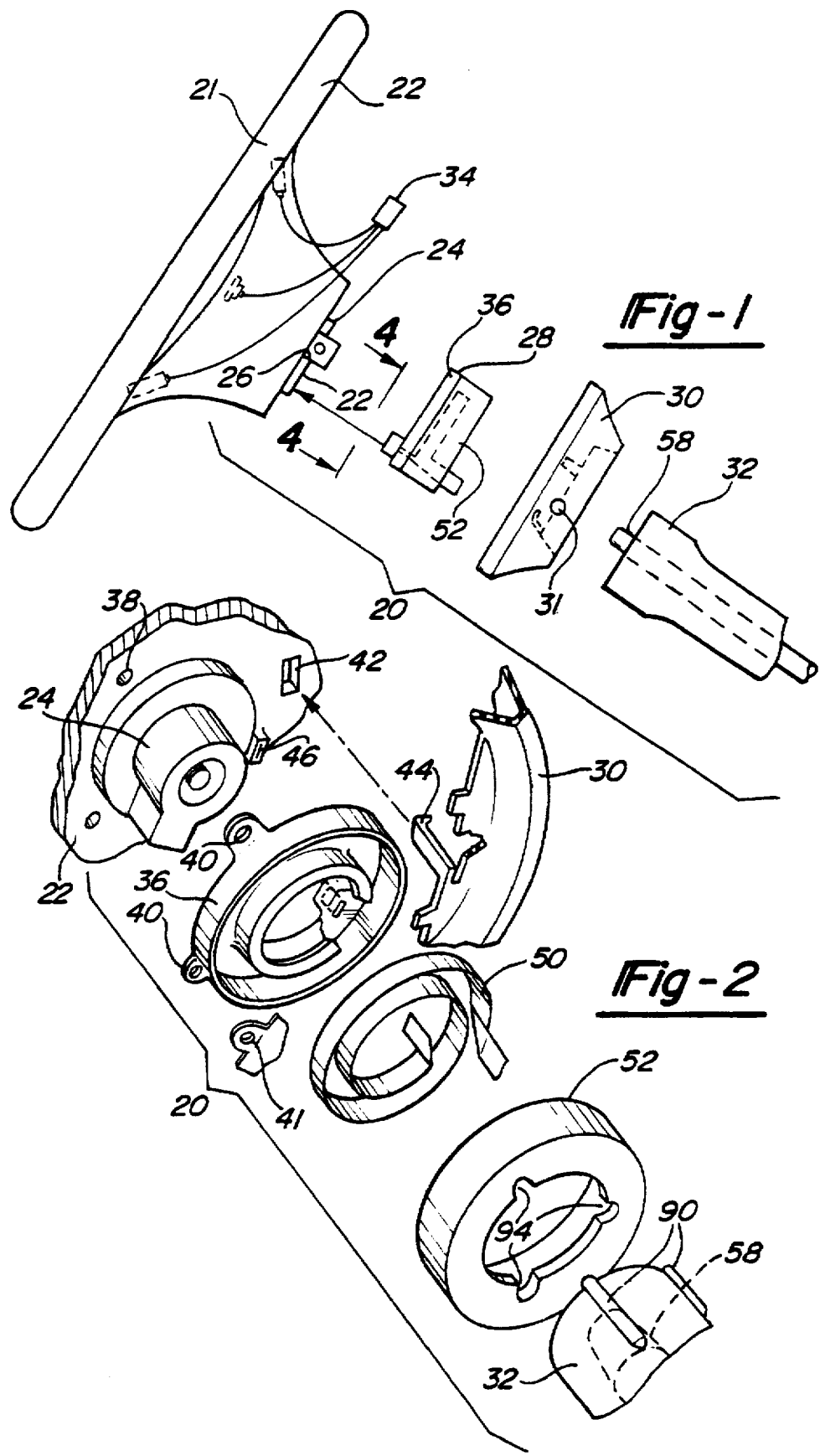

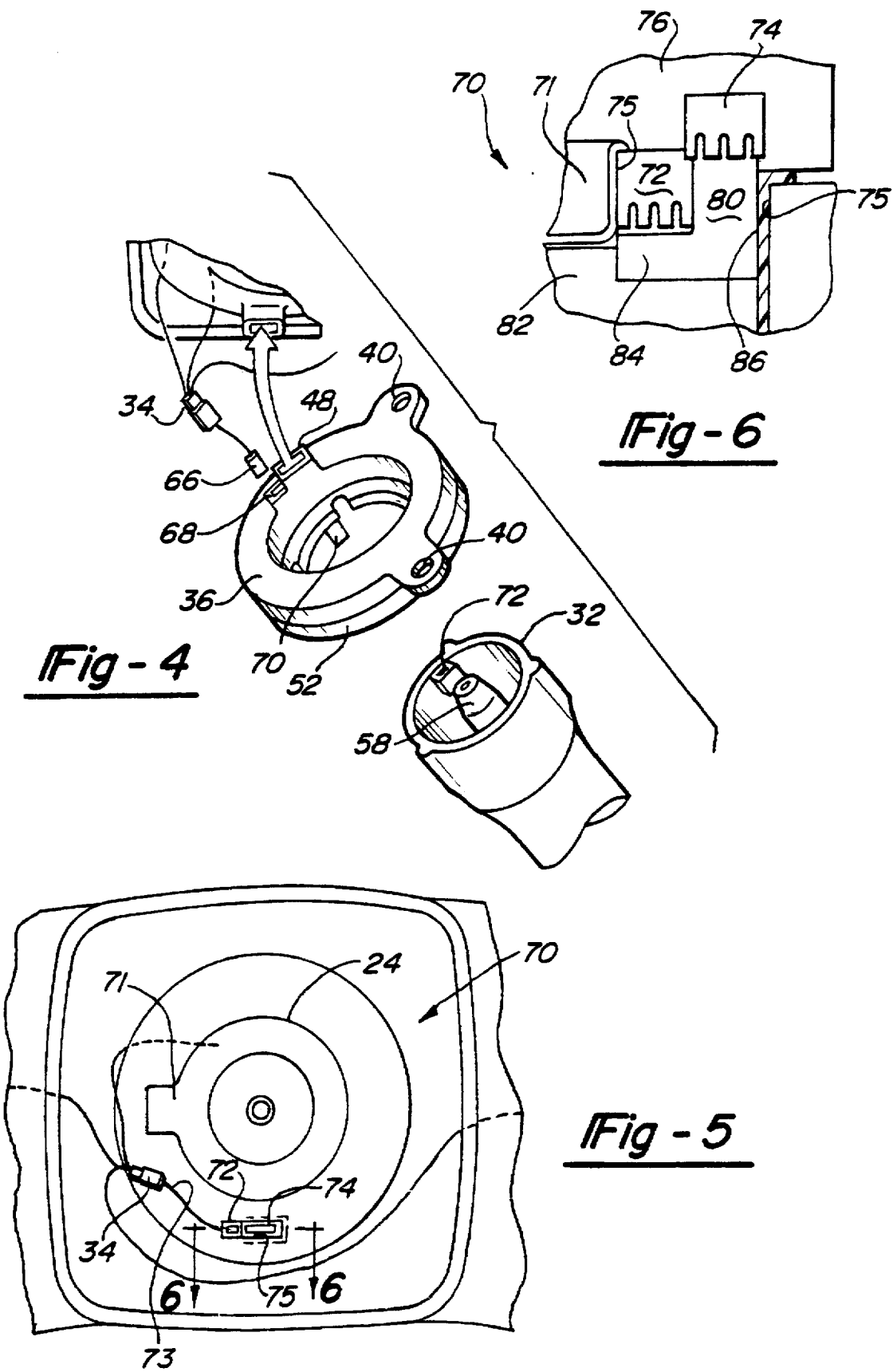

MODULAR CLOCK SPRING ARRANGEMENT

BACKGROUND OF THE INVENTION

This invention relates to a clock spring which may be incorporated into a modular steering wheel and air bag combination.

Steering wheels are incorporating more electric controls, and the provision of electrical connections to and from the steering wheel is becoming more important. As an example, in most modern vehicles the steering wheel carries cruise control and horn switches which must communicate to electrical controls and accessories. In addition, signals from sensors on the vehicle must be connected to the air bag igniter.

The steering wheel must also be able to freely rotate relative to the steering column. As such, standard electric connections have not been appropriate for communicating signals to or from the steering wheel. Instead, a device known as a clock spring has typically supplied the signals to and from the steering wheel. A clock spring includes a plate that rotates with the steering wheel, and a housing fixed to the steering column. The rotating plate receives one end of a wire ribbon, and the other end of the wire ribbon is fixed to the fixed housing. The wire ribbon coils on itself as the steering wheel rotates to communicate electrical signals to and from the steering wheel.

With the inclusion of air bags into the steering wheel, it has become more complicated to assemble the steering wheel to a steering column. Typically, the steering wheel has been initially attached to the steering column with no cover. The air bag has been attached, and the cover is then placed over the air bag. For several reasons, this is undesirable.

Recently, methods and apparatus have been proposed that allow the steering wheel and air bag to be assembled to the steering column as a modular assembly. Such inventions are set forth in U.S. patent application Ser. Nos. 08/522,627 and 08/547,493, owned by the assignee of this invention.

It would be desirable to allow the clock spring to be quickly and easily attached as a modular unit along with the steering wheel and air bag. However, prior art clock springs have typically not provided such modular attachment.

SUMMARY OF THE INVENTION

In a disclosed embodiment of this invention, the clock spring is mounted on tubular members extending rearwardly from the hub of the steering wheel. The rear cover is also received over those tubular members. Once the clock spring and rear cover are mounted on the rear of the hub, the unit is mounted as a single piece on the steering column. In preferred embodiments of this invention, the tubular members extending rearwardly from the hub are bolts which secure an air bag inflator to the hub. In other features, the cover preferably has a tab which snaps into an opening in the rear of the hub.

In other preferred embodiments, the inventive clock spring is used with a hub containing an attachment structure such as a worm and gear arrangement. The worm is driven by an external tool to drive the gear onto the steering column, securing the modular unit to the steering column. The worm is accessible radially outwardly of the modular unit, and the entire modular unit may be pre-assembled and then attached to the steering column.

Preferably, the rotating plate also has structure which snaps into an opening in the rear of the hub to communicate electrical signals to and from at least the air bag igniter. In one embodiment, the connection to the air bag igniter may be a direct or hard connection. Alternatively, a wire harness connection may communicate to the igniter. At the same time, electrical connections from the other components on the steering wheel communicate through a wire harness to a second electrical connection which is also connected to the rotating plate. In one embodiment, an opening in the rear of the steering wheel hub receives both connections such that the rotating plate may also be snapped into both connections to complete all electrical connections.

In another feature of this invention, structure on the fixed housing of the clock spring radially aligns the clock spring relative to the steering column. It is important that the clock spring housing be properly aligned relative to the steering column, as this facilitates the operation of the clock spring. At the same time, with the inventive gear drive mount, the modular unit, including the clock spring, must be able to move axially along the steering column. The inventive structure allows such movement.

These and other features of the present invention will be best understood from the following specification and drawings, of which the following is a brief description.

BRIEF DESCRIPTION OF THE DRAWINGS

FIG. 1 is an exploded view of the inventive modular steering wheel and clock spring assembly.

FIG. 2 shows details of the clock spring arrangement.

FIG. 4 is an exploded view of the major components of the inventive structure.

FIG. 5 shows an alternative structure.

FIG. 6 is a cross-sectional view along line 6—6 as shown in FIG. 5.

DETAILED DESCRIPTION OF PREFERRED EMBODIMENTS

Figure 3:
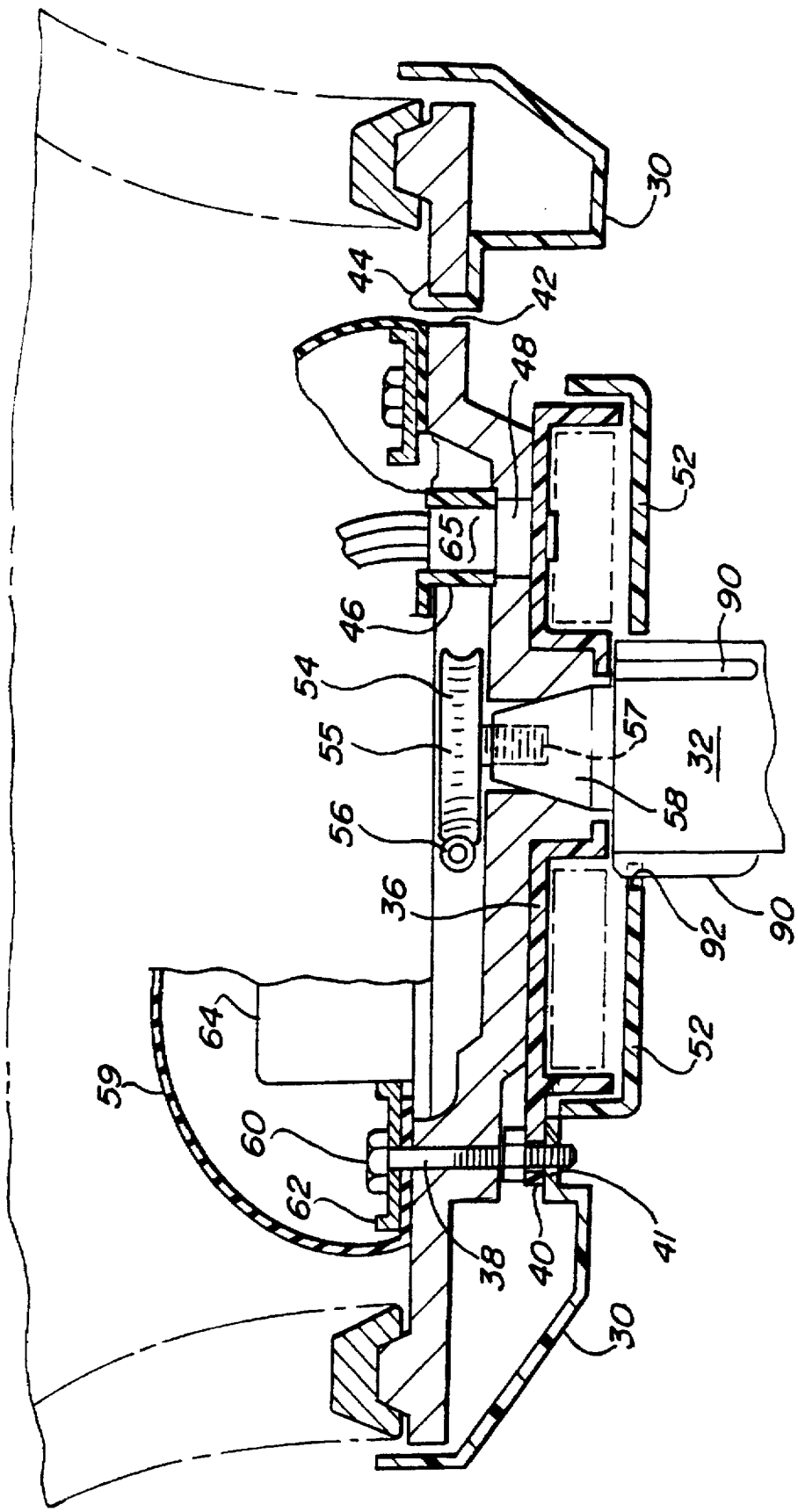
FIG. 3 is a cross-sectional view through one embodiment of this invention.

FIG. 1 shows a modular steering wheel clock spring and air bag assembly 20. An armature 21 is to be gripped by an operator, and is fixed to a hub 22. Steering wheel hub 22 includes an attachment structure 24 having an opening 26 providing access to a drive worm as will be described below. The hub 22 and armature 21 may be separate or may be a single part. Although a worm and gear drive combination are illustrated, any drive combination which allows the attachment of the modular unit after pre-assembly may be substituted. Other examples are shown in the two above-referenced patent applications, the attachment structure of which is incorporated herein by reference.

A clock spring 28 snaps onto the rear of the steering wheel. A rear cover 30 snaps over the clock spring. An opening 31 in the side of the cover provides access to the opening 26 in steering wheel hub 22. The entire arrangement is to be attached to steering shaft 58. As also shown, a number of electrical connections 34 extend from components on the steering wheel and are also connected to clock spring 28.

As shown in FIG. 2, rotating plate 36 in clock spring 28 is secured on tubular members which extend through holes 38 in the rear of the hub 22. Tabs 40 on the rotating plate 36 are aligned with the holes 38. Similar holes 41 are formed on the rear cover 30, and the three members are sandwiched together on a tubular member, as will be disclosed below. Opening 42 is formed in the rear of the hub 22. Tab 44 from rear cover 30 snaps into opening 42 to sandwich the three members together. A second opening 46 in the rear of hub 22 receives electrical connections 48 from the rotating plate 36. As will be disclosed below, the openings 42 and 46 can be combined into a single opening.

Ribbon 50 and fixed housing 52 are generally as known in the art, and are schematically shown for clock spring 28. Fixed housing 52 does have an inventive alignment feature, described below, which aligns the fixed housing 52 relative to the steering column 32.

As shown in FIG. 3, a gear 54 includes teeth 55 that are driven by worm gear 56 to drive bolt 57 into shaft 58 of steering column 32. As is explained in greater detail in the above-referenced applications, air bag 59, shown schematically, may be assembled to the steering wheel column, and a tool inserted through the openings 31 and 26. The tool drives worm 56 to turn gear 54 and drive bolt 57 into shaft 58. Since the openings 31 and 26 are accessible from outside of the assembled modular unit, the entire modular unit including wheel 22, hub 24, clock spring 28 and rear cover 30 may all be pre-assembled prior to attachment to the steering column 32.

As also shown in FIG. 3, bolt 60 extends through a ring 62 that secures the air bag igniter 64. Electrical connection 48 may extend into a connection 65, which is connected by a wire harness to igniter 64, as shown schematically. Thus, when the connection shown in FIG. 3 is made, electrical communications for igniter 64 pass from sensors on the body of the vehicle through the clock spring. At the same time, connections 34 are also made to the other components on the steering wheel, as described in FIG. 4.

Weld bolts 60 are welded to the plate 62 and extend through openings 38 in the rear of hub 22. Ears 40 and ears 41 are mounted on bolts 60 such that the rear cover 30 and rotating plate 36 are sandwiched to the hub. Tab 44 holds the three members together, and they rotate as a unit. In this way, the clock spring 28 is easily and securely attached to the hub 22 as a pre-assembled unit. Rear cover 30 is also easily attached onto the steering wheel assembly.

FIG. 4 shows further details of the modular assembly, including the provision of electrical connection 66 from connections 34 to be received in connection 68 on rotating plate 36. As further shown, a connection 70 extends from the fixed housing 52 into an opening 72 in the steering column 32. In this way, fixed housing 52 is easily connected to steering column 32.

FIG. 5 shows another embodiment 70 of the present invention. In embodiment 70, all of the electrical connections between the plate and hub are made through a single hole in the rear of hub 71. As shown, connections 34 leading from the steering wheel all extend to a first plug-in connection 72. Connection 72 facilitate the sub-assembly of the hub. A wire harness 73 connects connection 72 to connection 34. A hole 75 receives connection 72, and a hard connection 74 for the igniter is seen spaced into the paper at opening 75. Hard connection 74 may be associated with an opening formed within the body of the air bag igniter. Further, there is space to the side of the connection 74.

As shown in FIG. 6, when the rotating plate 82 is connected to hub 71, connections 84 plug into connection 72 to complete circuits to the electrical components on the steering column. At the same time, igniter connection 74 receives connections 80 from rotating plate 82. Tab 86 from the rear cover also snaps into the opening 75. Thus, all of the connections are made in a single opening in the hub. Although the hard connection 74 and 80 is shown only in this embodiment, it should be understood that a hard connection could be combined into the first embodiment which used separate openings. Moreover, a wire harness connection to the air bag igniter could be substituted for the hard connection shown in this embodiment, while still utilizing a single hole in the hub.

Figure 7:
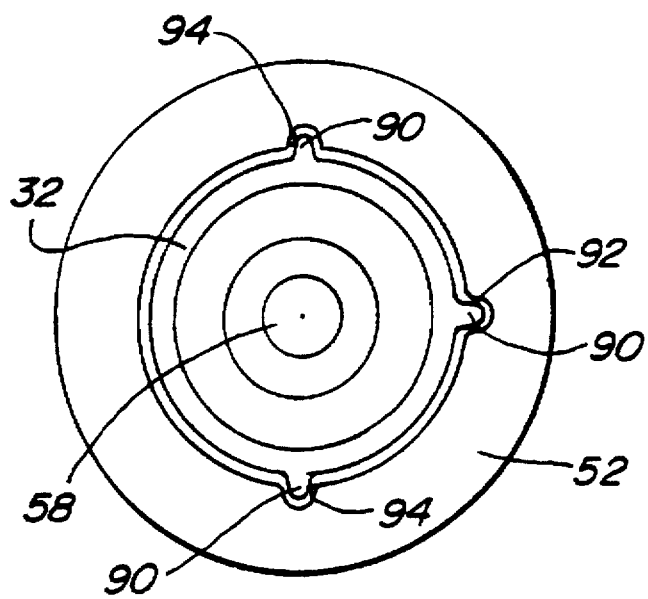
FIG. 7 shows an alignment feature of the present invention.

FIG. 7 is a cross-sectional view through the assembled fixed housing 52 and steering column 32. As shown, shaft 58 is received within steering column 32. Radial alignment pins 90 extend radially outwardly from the steering column 32. Those pins are aligned with grooves 92 and 94 which extend axially along at least a portion of the housing 52. The groove 92 is more closely sized to receive the pin 90, and provide the actual radial alignment. The grooves 94 provide guidance, but are a looser fit with pins 90. The means to secure the assembly shown in FIG. 3, including the worm 56 and gear 54, drive the entire assembly axially down into the shaft 58, wedging the assembly on shaft 58. During this axial movement, the entire clock spring including fixed housing 52 moves axially relative to the steering column 32. As such, the alignment pins 90 must be able to move axially within grooves 92 and 94. As shown, for example, in FIG. 2, the pins extend for a greater axial distance than the groove, thus allowing such axial movement.

Figure 8:
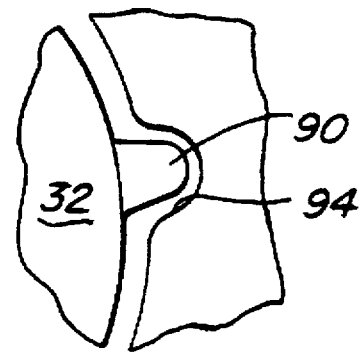
FIG. 8 is a detail of the FIG. 7 structure.

As shown in FIG. 8, at least the grooves 94 are formed with sloping sides to help guide the pins 90 into the grooves when initially aligning the combined assembly on the steering column 32.

Although the pins 90 are shown extending from the steering column 32, and the grooves 92 and 94 are shown in the fixed housing 52, the pins could extend from the fixed housing into grooves in the steering column. Moreover, it may be that the fixed housing is received within the steering column, rather than around the steering column, as shown in the figures.

Figure 9:
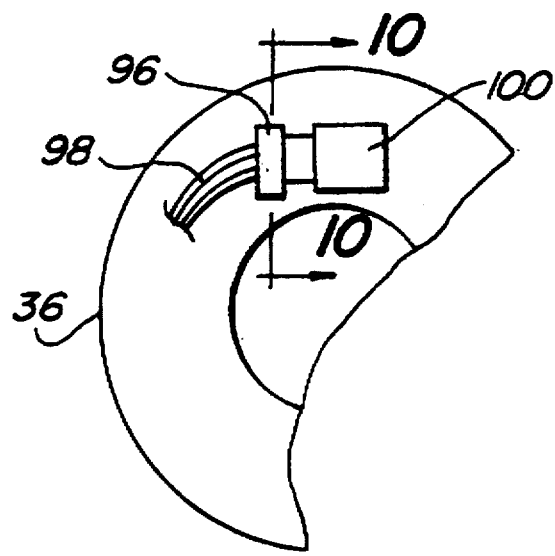
FIG. 9 shows another feature of the present invention.
Figure 10:
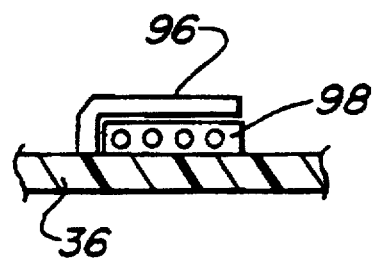
FIG. 10 is a cross-sectional view along line 10—10 as shown in FIG. 9.

Another feature of this invention is shown in FIGS. 9 and 10. Rotating plate 36 is formed with a clip 96. Clip 96 holds a wire harness 90 and a connection 100 during pre-assembly of the clock spring 28. In this way, the location of the connection 90 is maintained in a desired orientation during shipment and storage. The clip 96 will hold the wire harness 98 and connection 100, and prevent damage. As shown in FIG. 10, the clip 96 may merely be a molded clip formed on a face of the clock spring rotating plate 36.

Although several types of electrical connectors are shown schematically in this application, it should be understood that the details of the connections may vary from those illustrated in this application. The details of the electrical connections form no part of this invention, and may be as known in the prior art. It is the location and placement of such known connections which is the inventive feature of this application relative to such connections.

In a method of assembly, the modular combination of the steering wheel 22 and hub 24 are first connected. The clock spring 28 may then be snapped onto the rear of the hub 24. The electrical connections are also made at this time. Rear cover 30 may then be snapped onto the combination, sandwiching the clock spring 28 between the hub 24 and the cover 30. The entire modular assembly may then be connected to the steering column 32 by driving the worm gear through the openings 31 and 26. The alignment structure 90 and 92 insures the clock spring is properly aligned on the steering column. The clip 96 protects the wire harness 98 prior to attachment.

Although preferred embodiments of this invention have been disclosed, a worker of ordinary skill in the art would recognize that certain modifications would come within the scope of this invention. For that reason, the following claims should be studied to determine the true scope and content of this invention.

We claim:

1. A steering wheel assembly comprising:

a steering wheel armature to be gripped by an operator of a vehicle, a steering wheel hub fixed to said armature, an air bag assembly received on said hub, and a means to secure the armature, hub and air bag to a steering column after pre-assembly of said armature, hub and air bag;

elongate members extending rearwardly from said hub; and a clock spring having a rotating plate and a fixed housing, said rotating plate having tabs received on said elongate members, and a rear cover sandwiching said clock spring between said rear cover and said hub, said rear cover also having tabs received on said elongate members.

2. An assembly as recited in claim 1, wherein said elongate members are bolts which secure a portion of said air bag assembly to said hub, and extend rearwardly through openings in said hub.

3. An assembly as recited in claim 1, wherein said rear cover has a tab which snaps into an opening in said hub.

4. An assembly as recited in claim 1, wherein there is an opening through said rear cover providing access to said means to secure to allow the combination of said armature, said hub, said air bag, said rear cover and said clock spring to all be pre-assembled and then attached to the steering column as a single unit.

5. An assembly as recited in claim 4, wherein said fixed housing of said clock spring includes structure that allows said unit to move axially along the steering column, while still radially aligning said unit on said steering column.

6. An assembly as recited in claim 1, wherein said clock spring has a first connection which extends into an opening in said hub to complete communication between a portion of said air bag assembly and said clock spring.

7. An assembly as recited in claim 6, wherein said first connection includes a hard electrical connection between said rotating plate of said clock spring, and an opening in an igniter for said air bag assembly.

8. An assembly as recited in claim 6, wherein said opening in the rear of said hub also receives a second connection to complete electrical connections between components mounted on said steering wheel and said clock spring.

9. An assembly as recited in claim 8, wherein said cover includes a tab which snaps into an opening in a rear of said hub, and a single opening in said hub receiving said first connection, said second connection and said tab.

10. A steering wheel assembly comprising:

a steering wheel armature to be gripped by an operator of a vehicle, a steering wheel hub fixed to said armature, an air bag assembly received on said hub, and a means to secure the armature, hub and air bag to a steering column after pre-assembly of said armature, hub and air bag;

a clock spring having a rotating plate and a fixed housing, a rear cover sandwiching said clock spring between said rear cover and said hub; and said means to secure allowing the combination of said armature, said hub, said air bag, said rear cover and said clock spring to all be pre-assembled into a single unit and then attached to the steering column as a single unit.

11. An assembly as recited in claim 10, wherein said fixed housing of said clock spring includes alignment structure that allows said single unit to move axially along a steering column, while radially aligning said unit on the steering column.

12. An assembly as recited in claim 11, wherein said alignment structure includes pins extending from one of the steering column and said fixed housing into grooves in the other of the steering column and said fixed housing to provide radial alignment of said fixed housing on the steering column.

13. An assembly as recited in claim 11, wherein said clock spring has a first connection which extends into an opening in said hub to complete communication between a portion of said air bag assembly and said clock spring, said first connection includes a hard first connection between said rotating plate of said clock spring, and an opening in an igniter for said air bag assembly.

14. An assembly as recited in claim 13, wherein an opening in the rear of said hub also receives a second connection to complete electrical connections between components mounted on said steering wheel and said clock spring.

15. An assembly as recited in claim 14, wherein said cover includes a tab which snaps into an opening in a rear of said hub, and a single opening receiving said first connection, said second connection and said tab.

16. An assembly as recited in claim 10, wherein said rear cover has a tab which snaps into an opening in said hub to sandwich said hub, said clock spring and said cover.

17. An assembly as recited in claim 10, wherein said rotating plate has a clip to secure a wire harness on said rotating plate at a desired location.

18. A clock spring comprising:

a rotating housing including electrical connections for connection to a steering wheel sub-assembly, said rotating housing being adapted to rotate with a steering wheel shaft;

a fixed housing to be connected to a steering column housing, the steering column housing surrounding the steering wheel shaft, said fixed housing rotatably supporting a rotating plate; and structure on said fixed housing for providing radial alignment between said fixed housing and the steering column housing, but allowing relative axial movement between said fixed housing and the steering column housing, said structure including either a pin or a groove to cooperate with a mating groove or pin that is formed on the steering column housing.

19. A clock spring as recited in claim 18, wherein said fixed housing includes said grooves.

20. A clock spring as recited in claim 18, wherein said electrical connection includes a hard connect to be received in an air bag igniter.

21. A clock spring as recited in claim 18, wherein said rotating plate includes tabs to be received on elongate members extending from the steering wheel sub-assembly.

* * * * *